United States Patent [19]

DuRocher et al.

[11] 3,918,783

[45] Nov. 11, 1975

[54] APPARATUS FOR ELECTRICALLY CONNECTING CONDUCTORS ON GLASS SUBSTRATES

[75] Inventors: Gideon A. DuRocher; Daniel J. DuRocher, both of Mt. Clemens, Mich.

[73] Assignee: Essex International, Inc., Fort Wayne, Ind.

[22] Filed: Apr. 17, 1974

[21] Appl. No.: 461,537

[52] U.S. Cl. ............ 339/17 LC; 219/203; 219/522; 339/DIG. 3

[51] Int. Cl.² ............................................ B60L 1/02

[58] Field of Search ........... 339/17 R, DIG. 3, 17 L, 339/17 LC, 17 LM; 219/203, 522, 549; 174/68.5

[56] References Cited

UNITED STATES PATENTS

| | | | |
|---|---|---|---|
| 2,431,673 | 12/1947 | Auger | 219/203 X |
| 3,329,851 | 7/1967 | Braeutigam et al. | 339/DIG. 3 |
| 3,509,296 | 4/1970 | Harshman et al. | 339/DIG. 3 |
| 3,529,074 | 9/1970 | Lewis | 219/522 X |

*Primary Examiner*—Roy Lake

*Assistant Examiner*—E. F. Desmond

[57] ABSTRACT

A plurality of parallel, spaced apart conductors supported on a glass substrate are connected by means of conductive members carried by the substrate and which are of such length as to span all of the conductive members. Compressible elastomeric pads containing conductive particles are interposed between the conductive members and the conductors in engagement with the latter and are maintained in compression so as to establish a conductive path between the conductive members and the conductors.

15 Claims, 6 Drawing Figures

APPARATUS FOR ELECTRICALLY CONNECTING CONDUCTORS ON GLASS SUBSTRATES

This invention relates to apparatus for establishing an electrical connection between a source of electrical potential and conductive elements carried by a non-conductive substrate so as to enable the substrate to be heated electrically. Electrically heated, non-conductive substrates have many applications. For example, it is common to provide a glass substrate such as a window pane or light with resistance heating elements which, when connected to a source of potential, heat the substrate to a temperature sufficient to prevent moisture from condensing thereon. Such a construction frequently is found at the rear light of an automotive vehicle.

A conventional, electrically heated, rear light for an automotive vehicle comprises a substrate of transparent glass on which a plurality of spaced apart, parallel resistance elements is deposited. Corresponding ends of such elements are connected to a source of electrical potential and the other ends of such elements are grounded or otherwise suitably connected in an electrical circuit of which the source is a part. The conventional connection of the resistance elements in the circuit comprises a strip of braided wire which is soldered to the resistance elements. Such a construction has several disadvantages. For example, the localized heating caused by soldering the wire braid to the resistance elements often results in weakening or cracking of the glass substrate. In addition, it is seldom that all of the wires of a braided conductor can be in conductive engagement with the resistance elements, as a consequence of which not all of the resistance elements are capable of being supplied with a substantially uniform current. In such a case, not all of the resistance elements will be capable of heating the substrate to the extent necessary to prevent the accumulation of some moisture on the substrate.

In some cases the marginal edges of a substrate should be completely free from electrical apparatus so as to enable a sealing strip to be applied to the marginal edge of the substrate. In other cases, however, there is no objection to the presence of electrical apparatus at the marginal edges of the substrate.

An object of this invention is to provide apparatus for connecting conductors carried by a non-conductive substrate to a source of electrical potential and which avoids the necessity of the use of heat in applying the connecting apparatus.

Another object of the invention is to provide apparatus of the character described and which provides for a relatively uniform distribution of current among a plurality of electrical conductors.

A further object of the invention is to provide connecting apparatus of the character referred to and which can be mounted either in embracing relation to the marginal edge of a substrate or to a surface of the substrate so as to leave the marginal edge free.

Other objects and advantages of the invention will be pointed out specifically or will become apparent from the following description when it is considered in conjunction with the appended claims and the accompanying drawings wherein:

FIG. 1 is a fragmentary plan view of apparatus constructed in accordance with one embodiment of the invention;

FIG. 2 ia an enlarged, sectional view taken on the line 2—2 of FIG. 1;

Figure 1:
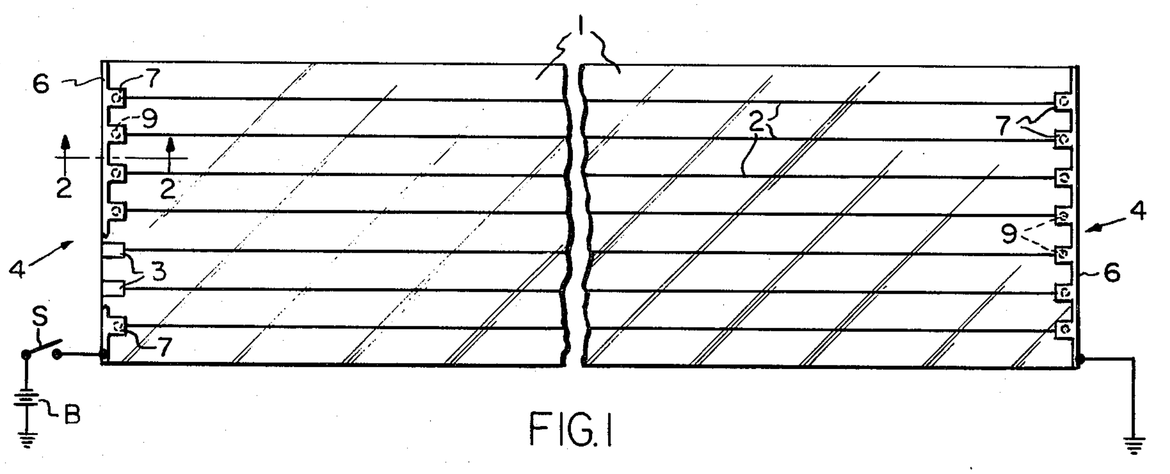

Apparatus constructed in accordance with each of the disclosed embodiments of the invention is adapted for use with a substrate 1, such as transparent glass, which carries on one surface thereof a plurality of spaced, substantially parallel conductors such as resistance heating elements 2. The heating elements 2 may be composed of any one of a number of different materials and may be applied to the substrate by any one of a number of different methods. For example, the resistance elements 2 may comprise silver ceramic strips which are deposited on the substrate by a silk screening process.

Each resistance element 2 terminates at each end in an enlarged terminal 3 which is adjacent, but spaced from the marginal edge of the substrate. The terminals 3 preferably are formed of the same material as the elements 2 and are deposited on the substrate in the same manner.

Figure 2:
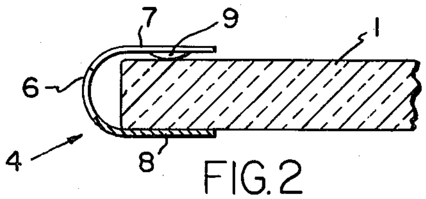
Figure 3:
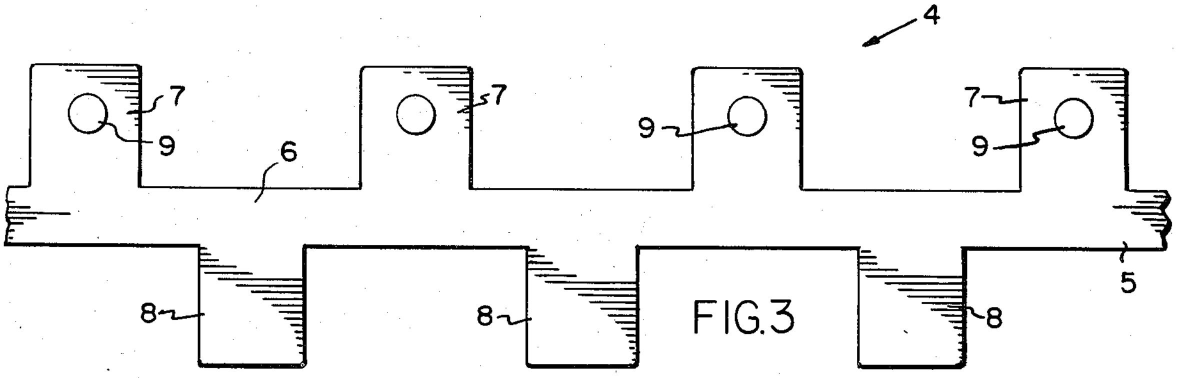
FIG. 3 is a fragmentary, plan view of a body from which the apparatus shown in FIG. 1 is formed.

A connector constructed according to the embodiment of the invention disclosed in FIGS. 1 – 3 is designated generally by the reference character 4 and is formed from a flat body 5 of resilient, highly conductive metal such as tempered beryllium copper or other material having a resistance less than that of the elements 2 and the terminals 3. The body 5 has a spine 6 provided with coplanar fingers 7 and 8 which extend in opposite directions from the spine. The fingers 7 are spaced from one another a distance corresponding substantially to the spacing between the resistance elements 2 and have a width somewhat greater than that of the elements 2. The fingers 8 are spaced similarly to the spacing of the fingers 7, but are staggered with the latter. The body 5 may be formed by a conventional stamping process.

Following the forming of the body 5 the spine 6 is bent along its longitudinal axis and about a radius corresponding substantially to half the thickness of the substrate 1 so as to form a U-shaped structure. Preferably, the spine 6 is bent through at least 180° so that the spacing between the confronting surfaces of the fingers 7 and 8 corresponds substantially to the thickness of the substrate 1, whereby the body 5 may embrace one end of the substrate with the fingers 7 and 8 frictionally engaging its opposite surfaces. Each finger 7 is of such length, in a direction away from the spine 6, that it overlies one of the terminals 3.

The connector 4 includes a plurality of pads 9 interposed between the terminals 3 and the fingers 7. Each pad preferably comprises a body of resilient, compressible elastomeric material, such as silicone rubber, throughout which is dispersed a large quantity of discrete, electrically conductive particles. The particles preferably are copper spheres having a diameter of between 0.003 and 0.010 inch, each of the spheres being coated with a highly conductive noble metal, such as silver, which, if it oxidizes, produces an electrically conductive oxide. The pads 9 may be produced by mixing a silicone rubber resin with an appropriate catalyst and then stirring into the mixture a quantity of conductive particles. The composite substance then is placed in a mold having the shape of the desired pad and cured.

Each pad 9 may be conductive without the application of compressive force or, alternatively, may be non-conductive until it is subjected to a predetermined compressive force. If a normally conductive pad 9 is desired, the conductive particles contained in the elastomeric body should constitute between about 75–95 weight percent of the pad and the pad should be molded under sufficient compression to assure engagement of a sufficient number of the particles to establish a conductive path through the pad.

If a normally non-conductive pad is desired, then the quantity of particles contained in the body may be fewer, or of smaller diameter, or both, although the particles should constitute not less than about 75 weight percent of the pad so as to assure the establishment of a conductive path through the pad without requiring excessive compression of the latter. In addition, it is not necessary to mold the pad under compression if a normally non-conductive pad is desired.

In the embodiment disclosed in FIGS. 1 – 3, a pad 9 is interposed between each finger 7 and the adjacent terminal 3. The thickness of the pad 9 is such that its presence between the substrate and the finger stresses the latter and deflects it away from the substrate. As a consequence, the resilience of the material from which the body 5 is formed causes the finger 7 constantly to exert a compressive force on the pad 9. This force is sufficient to maintain the pad 9 in place between its associated finger 7 and the substrate 1, thereby dispensing with the need for affixing the pads 9 to the finger 7. Moreover, the thickness of each pad 9 is such that the compressive force exerted thereon by the associated finger subjects the pad to sufficient compressive force to cause a number of the conductive particles to engage one another and establish a conductive path through the pad, regardless of whether the pad originally is conductive or non-conductive.

Although it is not essential that the pads 9 be affixed to the fingers 7, it may be desirable in some instances to do so. In this event, each pad may be adhered to its associated finger, either before or following bending of the body 5 about its spine 6, by any one of a number of known electrically conductive cements.

FIG. 1 diagrammatically illustrates an electrical circuit comprising a source of electrical potential, such as a battery B, having one terminal connected to ground and the other terminal connected to one of the connectors 4 via a switch S. The other connector 4 is connected to ground. Upon closing of the switch S a conductive path is established from the battery B to the connector 4 and through the associated pads 9 to the resistance elements 2. At the other end of the substrate 1 a conductive path is established from the elements 2 through the associated pads 9 to the connector 4 and thence to ground.

Figure 4:
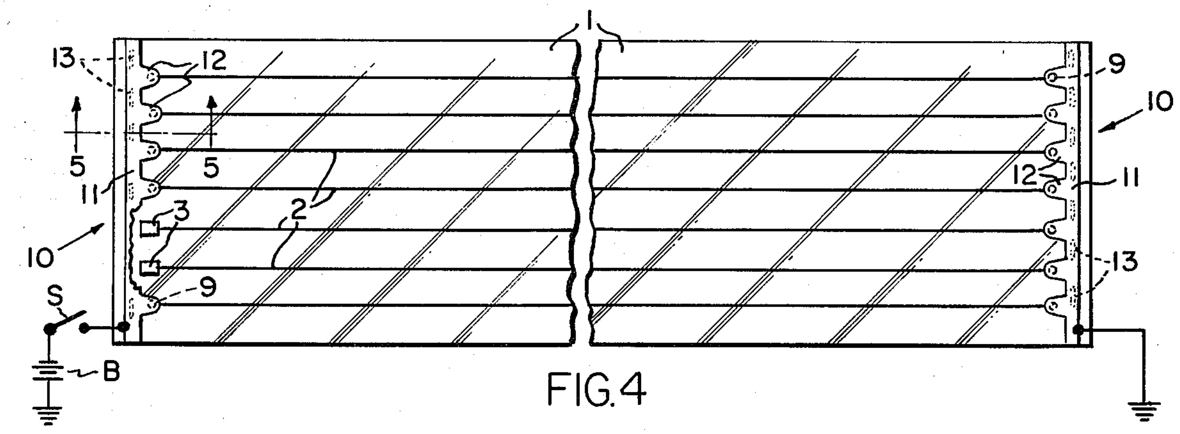
FIG. 4 is a view similar to FIG. 1, but illustrating a modified embodiment of the invention.
Figure 5:
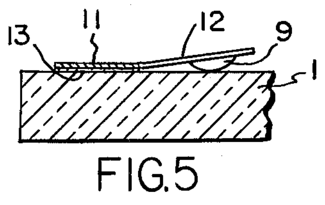
FIG. 5 is an enlarged, cross-sectional view taken on the line 5—5 of FIG. 4.
Figure 6:
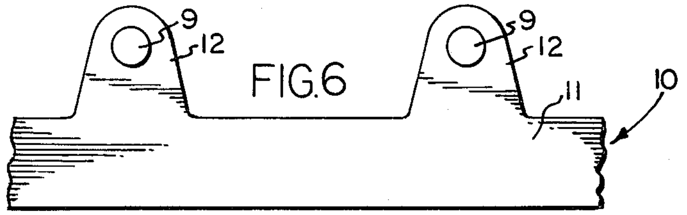
FIG. 6 is a fragmentary, enlarged, bottom plan view of one of the bodies shown in FIG. 4.

The apparatus shown in FIGS. 4 and 5 utilizes the same substrate 1 previously described and which also is provided with the resistance elements 2 and the terminals 3. In this embodiment, however, the connectors 10 comprise a strip 11 of resilient, conductive material having a lower resistance than that of the elements 2 and the terminals 3, such as tempered beryllium copper, and having a plurality of laterally extending fingers 12 that are spaced from one another according to the spacing of the conductive element 2. The fingers preferably taper toward their free ends to increase the flexibility of the free ends of the fingers. The strips 11 are positioned inwardly from the marginal edges of the substrate 1 and may be adhered to the surface of the latter by adhesive 13. The adhesive should be one which is capable of accommodating the different expansion rates of metal and glass, the different expansion rates being due to different coefficients of thermal expansion. Several kinds of acceptable adhesives are available. For example, The Dexter Corporation, Pittsburg, California, manufactures a suitable acrylic adhesive sold under the trademark HYSOL and the 3M Company, Minneapolis, Minn., manufactures a suitable adhesive which is sold under the trademark SCOTCH-WELD 2216.

The connectors 10 are stamped from flat stock so that the strip 11 and the fingers 12 normally occupy the same plane. Each of the pads 9, however, is of such thickness that its presence between the associated finger and the substrate 1 stresses the finger, whereupon the resilience of the material from which the connector is made causes the fingers to exert a compressive force on the pads 9 so as to retain them in place and subject them to sufficient compressive force as to render and maintain them conductive.

Although the pads 9 may be interposed between the fingers 12 and the substrate following adhering of the connectors 10 to the substrate, the pads 9 preferably are adhered to the fingers 12 by a conductive cement prior to the assembly of the substrate and the connectors.

By proper selection of the size and quantity of conductive particles contained in each pad and by proper selection of the compressive force to which each pad is subjected, each pad may function not only as a bridge between the connector 4 or 10 and the conductive elements 2, but it also may function as a fuse or circuit breaker. In the disclosed embodiments, the voltage of the source B is known, the resistance of the connectors 4 or 10 is known, and the resistance of the conductive elements 2 is known. The resistance of the conductive particles also may be established, the resistance being that of the noble metal coating. Thus, the normal current of the circuit and the heat generated by the resistances may be calculated.

The amount of heat which may be withstood by the conductive particles is directly proportional to their size and inversely proportional to their resistance. Thus, the size and resistance of the particles contained in each pad should be such as to accommodate heat generated by the normal current of the circuit, but the particles should be smaller in size than that which would accommodate the heat generated by an overload current due to a short circuit, for example. If the size and resistance of the particles are selected with these considerations in mind, then each pad 9 may function as a circuit breaker in the sense that the heat generated by an overload current in excess of the normal current will decompose or consume one or more of the particles constituting the conductive path through the pad so as to interrupt the conductive path.

Once the conductive path through a pad 9 has been interrupted, it may be reestablished by subjecting the pad to a compressive force which is sufficient to cause others of the conductive particles to engage one another and reestablish a conductive path through the pad. This is possible because of the large quantity of particles contained in the pad and because not all of the particles will be consumed at one time. The compressive force exerted on a pad by the associated resilient finger may be sufficient to effect reestablishment of the conductive path automatically, or the compressive force may be such as to require compression of the pad manually. The force which must be exerted on a pad to reestablish a conductive path therethrough is directly proportional to the size of the particles, the area of the pad, and the thickness and hardness of the pad. Such force also is inversely proportional to the quantity of particles contained in the pad. The compressive force required to be exerted on pads of like construction for either automatic or manual reestablishment of the conductive path may be determined empirically.

The disclosed embodiments are representative of presently preferred forms of the invention but are intended to be illustrative rather than definitive thereof. The invention is defined in the claims.

We claim:

1. In combination: a non-conductive substrate; a plurality of spaced apart conductors carried by said substrate at one side length a conductive member of such lengths as to span said conductors and having resilient portions; means mounting said conductive member on said substrate with said resilient portions overlying said conductors; and a plurality of compressible pads corresponding in number and spacing to the number and spacing of said conductors and being interposed between and in engagement with said resilient portions and said conductors, each of said pads being electrically conductive when compressed, and the resilience of said resilient portions maintaining said pads in compressed, electrically conductive condition.

2. The construction according to claim 1 wherein said conductive member comprises a metal strip having spaced apart fingers extending therefrom and constituting said resilient portions.

3. The construction according to claim 2 wherein the number and spacing of said fingers corresponds to the number and spacing of said conductors.

4. The construction according to claim 2 wherein said fingers taper toward their free ends.

5. The construction according to claim 1 wherein said conductive member comprises a U-shaped structure snugly embracing said substrate at one edge of the latter.

6. The construction according to claim 5 wherein said U-shaped structure has a plurality of spaced apart fingers on opposite sides of said substrate, the fingers on said one side of said substrate constituting said resilient portions.

7. The construction according to claim 6 wherein the fingers on opposite sides of said substrate are staggered.

8. The construction according to claim 1 wherein said conductive member comprises a substantially flat strip of metal.

9. The construction according to claim 8 wherein said strip has spaced apart fingers extending from one edge thereof, said fingers constituting said resilient portions.

10. The construction according to claim 9 wherein each of said fingers tapers in a direction away from said strip.

11. The construction according to claim 1 wherein each of said pads is secured to said conductive member by electrically conductive adhesive.

12. In combination: a non-conductive substrate; a plurality of spaced apart conductors carried by said substrate at one side thereof, none of said conductors extending beyond said substrate; a pair of conductive members each of which is of such length as to span all of said conductors; means mounting one of said members adjacent one end of said substrate with a portion of such member overlying all of said conductors; means mounting the other of said members at the opposite end of said substrate with a portion of such other member overlying all of said conductors; and a compressible pad interposed between each of said conductors and the overlying portion of the respective members, each of said pads being electrically conductive when compressed, said portions of said members being resilient and maintaining the associated pads in compressed, electrically conductive condition.

13. The construction according to claim 12 wherein each of said conductive members comprises a U-shaped structure embracing said substrate.

14. The construction according to claim 13 wherein said portion of each of said members has resilient, spaced apart fingers engaging said pads.

15. The construction according to claim 12 wherein each of said conductive members comprises a flat strip having resilient, spaced apart fingers engaging said pads.

* * * * *

UNITED STATES PATENT AND TRADEMARK OFFICE

CERTIFICATE OF CORRECTION

PATENT NO. : 3,918,783

DATED : November 11, 1975

INVENTOR(S) : Gideon A. DuRocher and Daniel J. DuRocher

It is certified that error appears in the above-identified patent and that said Letters Patent are hereby corrected as shown below:

Column 2, line 1, change "ia" to --is--.

Column 5, line 26, change "length" to --thereof--.

Column 5, line 27, change "lengths" to --length--.

Signed and Sealed this

*fifteenth* Day of *June 1976*

[SEAL]

*Attest:*

RUTH C. MASON
*Attesting Officer*

C. MARSHALL DANN
*Commissioner of Patents and Trademarks*